United States Patent
Zhang et al.

(10) Patent No.: US 12,530,808 B2
(45) Date of Patent: Jan. 20, 2026

(54) PREDICTIVE ENCODING/DECODING METHOD AND APPARATUS FOR AZIMUTH INFORMATION OF POINT CLOUD

(71) Applicant: Honor Device Co., Ltd., Shenzhen (CN)

(72) Inventors: Wei Zhang, Shenzhen (CN); Fuzheng Yang, Shenzhen (CN); Yuxin Du, Shenzhen (CN); Wenjie Zou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 258 days.

(21) Appl. No.: 18/270,591

(22) PCT Filed: May 18, 2022

(86) PCT No.: PCT/CN2022/093678
§ 371 (c)(1),
(2) Date: Jun. 30, 2023

(87) PCT Pub. No.: WO2022/247716
PCT Pub. Date: Dec. 1, 2022

(65) Prior Publication Data
US 2024/0070922 A1    Feb. 29, 2024

(30) Foreign Application Priority Data
May 26, 2021 (CN) .......... 202110580220.6

(51) Int. Cl.
*G06T 9/00* (2006.01)
*G06T 7/521* (2017.01)

(52) U.S. Cl.
CPC .............. *G06T 9/00* (2013.01); *G06T 7/521* (2017.01); *G06T 2207/10028* (2013.01)

(58) Field of Classification Search
CPC . G06T 9/00; G06T 7/521; G06T 2207/10028; G06T 9/004; G06T 9/001;
(Continued)

(56) References Cited

U.S. PATENT DOCUMENTS

| 10,234,287 B2 | 3/2019 | Siercks et al. |
| 2018/0053324 A1 | 2/2018 | Cohen et al. |

(Continued)

FOREIGN PATENT DOCUMENTS

| CN | 110458939 A | 11/2019 |
| CN | 110991227 A | 4/2020 |

(Continued)

OTHER PUBLICATIONS

Liu et al.: LiDAR point's elliptical error model and laser positioning for autonomous vehicles [online] [Retrieved May 6, 2025] <URL: https://iopscience.iop.org/article/10.1088/1361-6501/abc6e1> (Year: 2020).*

(Continued)

*Primary Examiner* — King Y Poon
*Assistant Examiner* — Vincent Alexander Providence
(74) *Attorney, Agent, or Firm* — Slater Matsil, LLP (57) ABSTRACT

An encoding method includes: obtaining original point cloud data; obtaining depth information of a point cloud based on the original point cloud data; establishing a relationship between the depth information and azimuth information of the point cloud; and predictively encoding the azimuth information of the point cloud by using the relationship between the depth information and the azimuth information of the point cloud, to obtain coded stream information.

20 Claims, 4 Drawing Sheets

(58) Field of Classification Search
CPC .. H04N 13/161; H04N 19/593; H04N 19/597; H04N 19/13; H04N 19/149; H04N 2013/0081
See application file for complete search history.

(56) References Cited

U.S. PATENT DOCUMENTS

| | | |
|---|---|---|
| 2019/0051017 A1 | 2/2019 | Beek |
| 2021/0017859 A1 | 1/2021 | Dunn et al. |
| 2022/0159298 A1 | 5/2022 | Boyce |
| 2022/0398784 A1 | 12/2022 | Taquet et al. |

FOREIGN PATENT DOCUMENTS

| | | | |
|---|---|---|---|
| CN | 111009011 A | 4/2020 | |
| CN | 111699683 A | 9/2020 | |
| CN | 112565734 A | 3/2021 | |
| CN | 112637608 A | 4/2021 | |
| WO | 2015169338 A1 | 11/2015 | |
| WO | 2016185637 A1 | 11/2016 | |
| WO | 2020232281 A1 | 11/2020 | |
| WO | WO-2020248187 A1 * | 12/2020 | ........... H04N 19/124 |
| WO | 2021084292 A1 | 5/2021 | |

OTHER PUBLICATIONS

Khaled Mammou (Apple) et al: "[G-PCC][New proposal] Optimization of the predictive coding scheme for Spinning Lidars", 130. MPEGMeeting; Apr. 20, 2020-APR. 24, 2020 Alpbach; (Motion Picture Expert Group or ISO/IEC JTC1/SC29/WG11), No. m53618, Apr. 15, 2020 (2020-04015), 6 pages. (Year: 2020).*

Gao et al.: Predictive Geometry Coding [online] [Retrieved May 7, 2025] <URL: https://mpeg-pcc.org/index.php/public-contributions/g-pccnew-proposal-predictive-geometry-coding/> (Year: 2019).*

Ahn, Jae-Kyun et al., "Large-Scale 3D Point Cloud Compression Using Adaptive Radial Distance Prediction in Hybrid Coordinate Domains," IEEE Journal of Selected Topics in Signal Processing, Apr. 2015, 13 pages, vol. 9, No. 3, IEEE.

Houqiang, Li et al., "A Review of Point Cloud Compression", ZTE Technology Journal, Feb. 2021, 5 pages, vol. 27, No. 1, China Academic Journal Electronic Publishing House.

Khaled Mammou (Apple) et al: "[G-PCC][New proposal] Optimization of the predictive coding scheme for Spinning Lidars", 130. MPEGMeeting; Apr. 20, 2020-Apr. 24, 2020 Alpbach; (Motion Picture Expert Group or ISO/IEC JTC1/SC29/WG11), No. m53618, Apr. 15, 2020 (2020-04015), 6 pages.

"G-PCC codec description", 132. MPEG Meeting; Oct. 12, 2020-Oct. 16, 2020; Online; (Motion Picture Expert Group or ISO/IECJTCI/SC29/WG11), No. n19620, Dec. 31, 2020 (Dec. 31, 2020), 148 pages.

* cited by examiner

PREDICTIVE ENCODING/DECODING METHOD AND APPARATUS FOR AZIMUTH INFORMATION OF POINT CLOUD

CROSS-REFERENCE TO RELATED APPLICATIONS

This application is a national stage of International Application No. PCT/CN2022/093678, filed on May 18, 2022, which claims priority to Chinese Patent Application No. 202110580220.6, filed on May 26, 2021. The disclosures of both of the aforementioned applications are hereby incorporated by reference in their entireties.

TECHNICAL FIELD

The present invention pertains to the field of a point cloud encoding/decoding technologies, and particularly relates to a predictive encoding/decoding method and apparatus for azimuth information of a point cloud.

BACKGROUND

With the improvement of a hardware processing capability and the rapid development of computer vision, three-dimensional point cloud data has been widely used in fields such as virtual reality, augmented reality, self-driving, and environment modeling. However, a large-scale point cloud usually has a large amount of data, which is not conducive to the transmission and storage of the point cloud data. Therefore, the large-scale point cloud needs to be efficiently encoded/decoded.

In a conventional encoding/decoding technology for the large-scale point cloud, Cartesian coordinates of the point cloud are usually predicted by using cylindrical coordinates (including azimuth information, depth information, and the like) of the point cloud. Therefore, each cylindrical coordinate component of the point cloud needs to be predictively encoded in the prior art. Specifically, for predictive encoding of the azimuth information of the point cloud, a point cloud encoding/decoding method based on a prediction tree is provided in the prior art 1. First, a multiple of a difference between an azimuth of a current point and an azimuth obtained in a selected prediction mode with respect to an angular velocity of rotation needs to be calculated, and then the azimuth of the current point is predicted by using an integral multiple of the angular velocity of rotation and the azimuth obtained in the selected prediction mode, to obtain a prediction residual, and finally the integral multiple and the prediction residual of the azimuth are encoded to reconstruct azimuth information in the same manner on a decoder. A point cloud encoding/decoding method based on a single-chain structure is provided in the prior art 2. First, an azimuth of each point is quantized, and a quantized value of the azimuth of each point may be restored by using the single-chain structure. Then, a quantized residual of the azimuth is predictively encoded, and specifically, a prediction mode list is created, and an optimal prediction mode is selected by an encoder, to complete predictive encoding of azimuth information of a point cloud.

However, when the two methods are used to predictively encode the azimuth information of the point cloud, only encoded azimuth information is used for prediction, and a relationship between other information and the azimuth information is not considered. Consequently, the obtained prediction residuals of the azimuth information are large and are not centralized, and the validity of an entropy encoding context model is destroyed, and therefore, encoding efficiency of the azimuth information of the point cloud is low.

SUMMARY

To resolve the foregoing problem in the prior aft, the present invention provides a predictive encoding/decoding method and apparatus for azimuth information of a point cloud. Technical problems in the present invention are resolved by the following technical solutions:

A predictive encoding method for azimuth information of a point cloud includes:

obtaining original point cloud data;

obtaining depth information of a point cloud based on the original point cloud data;

establishing a relationship between the depth information and azimuth information of the point cloud; and predictively encoding the azimuth information of the point cloud by using the relationship between the depth information and the azimuth information of the point cloud, to obtain coded stream information.

In an embodiment of the present invention, the establishing a relationship between the depth information and azimuth information of the point cloud includes:

establishing the relationship between the depth information and the azimuth information of the point cloud by using a mathematical derivation method; or establishing the relationship between the depth information and the azimuth information of the point cloud by using a fitting method.

In an embodiment of the present invention, a relational expression between the depth information and the azimuth information of the point cloud is established by using the mathematical derivation method as follows:

$$\varphi - \varphi_0 = -\alpha - \arctan\frac{H_o}{r}.$$

$\varphi$ represents azimuth information of a point, $\varphi_0$ represents originally collected azimuth information of the point, r represents depth information of the point, $\alpha$ represents a horizontal correction angle of a laser to which the point belongs, and $H_o$ represents a horizontal offset of the laser to which the point belongs.

In an embodiment of the present invention, a relational expression between the depth information and the azimuth information of the point cloud is established by using the mathematical derivation method as follows:

$$\varphi - \varphi_0 = 90° - \alpha - \arccos\left(-\frac{H_o}{r}\right).$$

$\varphi$ represents azimuth information of a point, $\varphi_0$ represents originally collected azimuth information of the point, r represents depth information of the point, $\alpha$ represents a horizontal correction angle of a laser to which the point belongs, and $H_o$ represents a horizontal offset of the laser to which the point belongs.

In an embodiment of the present invention, after the relational expression between the depth information and the azimuth information of the point cloud is obtained, the method further includes:

selecting several points from points collected by a same laser or encoded points and estimating unknown parameters $\alpha$ and $H_o$ in the relational expression based on information about the selected points.

In an embodiment of the present invention, formulas for estimating the unknown parameters α and $H_o$ by selecting two points are:

$$H_o = \frac{(r_1 - r_2) \cdot (1 + \tan\Delta\varphi_1 \cdot \tan\Delta\varphi_2) \pm \sqrt{(r_1 - r_2)^2 \cdot (1 + \tan\Delta\varphi_1 \cdot \tan\Delta\varphi_2)^2 - 4(\tan\Delta\varphi_1 - \tan\Delta\varphi_2)^2 \cdot r_1 \cdot r_2}}{2(\tan\Delta\varphi_1 - \tan\Delta\varphi_2)}$$

$$\tan\alpha = \frac{r_1 \cdot \tan\Delta\varphi_1 - r_2 \cdot \tan\Delta\varphi_2}{H_o \cdot (\tan\Delta\varphi_1 - \tan\Delta\varphi_2) - (r_1 - r_2)}.$$

$r_1$ and $r_2$ separately represent depth information of the two selected points, and $\Delta\varphi_1$ and $\Delta\varphi_2$ separately represent azimuth residuals of the two selected points.

In an embodiment of the present invention, the predictively encoding the azimuth information of the point cloud by using the relationship between the depth information and the azimuth information of the point cloud includes:

predicting the azimuth of the point cloud based on the relationship between the depth information and the azimuth information of the point cloud, to obtain an initial predicted value of an azimuth residual;

selectively shifting the initial predicted value of the azimuth residual to obtain a final predicted value of the azimuth residual and a prediction residual of the azimuth residual; and encoding the prediction residual of the azimuth residual and azimuth auxiliary information.

Another embodiment of the present invention provides a predictive encoding apparatus for azimuth information of a point cloud, including:

a data obtaining module, configured to obtain original point cloud data;

a data processing module, configured to obtain depth information of a point cloud based on the original point cloud data;

a first calculation module, configured to establish a relationship between the depth information and azimuth information of the point cloud; and a predictive encoding module, configured to predictively encode the azimuth information of the point cloud by using the relationship between the depth information and the azimuth information of the point cloud, to obtain coded stream information.

Still another embodiment of the present invention further provides a prediction decoding method for azimuth information of a point cloud, including:

obtaining coded stream information and decoding the coded stream information to obtain a prediction residual of an azimuth residual of a point cloud and azimuth auxiliary information;

predicting an azimuth of the point cloud by using reconstructed depth information and a relationship between the depth information and azimuth information, to obtain a final predicted value of the azimuth residual;

reconstructing the azimuth residual of the point cloud based on the final predicted value of the azimuth residual and the prediction residual of the azimuth residual; and reconstructing the azimuth information of the point cloud based on the reconstructed azimuth residual and the azimuth auxiliary information.

Yet another embodiment of the present invention further provides a prediction decoding apparatus for azimuth information of a point cloud, including:

a decoding module, configured to obtain coded stream information and decode the coded stream information to obtain a prediction residual of an azimuth residual of a point cloud and azimuth auxiliary information;

a prediction module, configured to predict an azimuth of the point cloud by using reconstructed depth information and a relationship between the depth information and azimuth information, to obtain a final predicted value of the azimuth residual;

a second calculation module, configured to reconstruct the azimuth residual of the point cloud based on the final predicted value of the azimuth residual and the prediction residual of the azimuth residual; and a reconstruction module, configured to reconstruct the azimuth information of the point cloud based on the reconstructed azimuth residual and the azimuth auxiliary information.

Beneficial effects of the present invention are as follows:

In the present invention, a relationship between depth information and azimuth information of a point cloud is established, and cross-component prediction is performed on the azimuth information by using the depth information of the point cloud and the foregoing relationship. In this way, prediction precision of the azimuth information of the point cloud is further improved, and a prediction residual of the azimuth information can be reduced, so that distribution of prediction residuals of an azimuth is more centralized. In this way, a more effective context model is established in an entropy encoding process, and therefore, encoding efficiency of the point cloud is improved.

The present invention is further described in detail below with reference to the accompanying drawings and embodiments.

DETAILED DESCRIPTION OF ILLUSTRATIVE EMBODIMENTS

The present invention is further described in detail below with reference to specific embodiments, but implementations of the present invention are not limited thereto.

Embodiment 1

Figure 1:
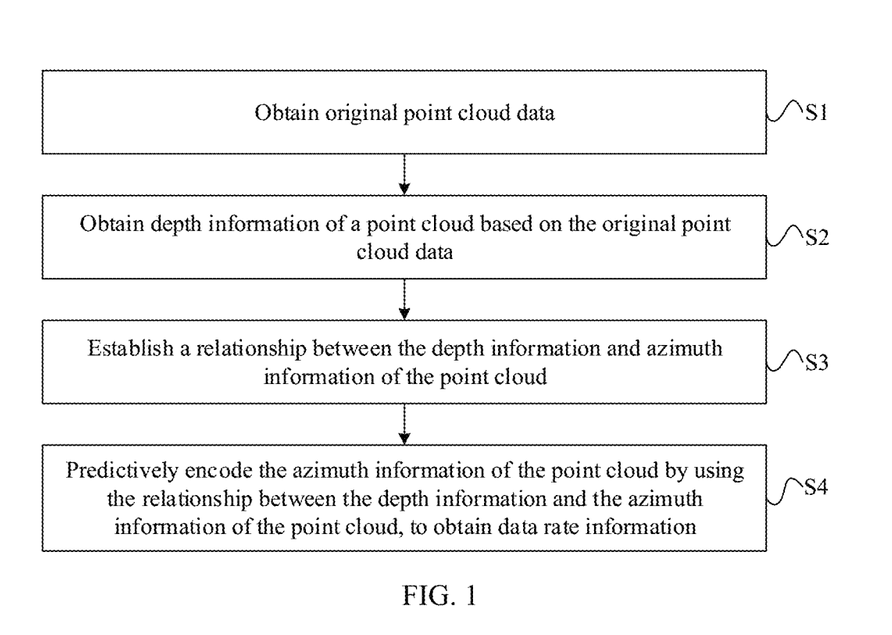
FIG. 1 is a schematic flowchart of a predictive encoding method for azimuth information of a point cloud according to an embodiment of the present invention.

FIG. 1 is a schematic flowchart of a predictive encoding method for azimuth information of a point cloud according to an embodiment of the present invention. The predictive encoding method for azimuth information of a point cloud specifically includes the following steps.

Step 1: Obtain original point cloud data.

Specifically, the original point cloud data generally includes a set of three-dimensional spatial points, each spatial point records geometric position information of the spatial point and additional attribute information such as color, reflectivity, and normal. Geometric position information of a point cloud is usually expressed based on a Cartesian coordinate system; in other words, coordinates x, y, and z of a point are used for representation. The original point cloud data may be obtained by a laser radar through scanning, or may be obtained by using common data sets provided by various platforms.

In this embodiment, the obtained geometric position information of the original point cloud data is represented based on the Cartesian coordinate system. It should be noted that a method of representing the geometric position information of the original point cloud data is not limited to Cartesian coordinates.

Step 2: Obtain depth information of a point cloud based on the original point cloud data.

Specifically, in this embodiment, the depth information of the point cloud may be calculated by using the following formula:

$$r = \sqrt{x^2 + y^2}.$$

r represents depth information of each point in the original point cloud data, and x and y are Cartesian coordinate components of each point.

In addition, it should be noted that the depth information of the point cloud may alternatively be calculated by using a formula $r = \sqrt{x^2 + y^2 + z^2}$ or in another manner, where (x, y, z) is Cartesian coordinates of a point.

Step 3: Establish a relationship between the depth information and azimuth information of the point cloud.

In this embodiment, a relationship between the depth information and the azimuth information of the point cloud may be established by using a mathematical derivation method.

For example, the relationship between the depth information and the azimuth information of the point cloud may be established from an algebraic perspective based on a collection principle of a laser radar.

Figure 2:
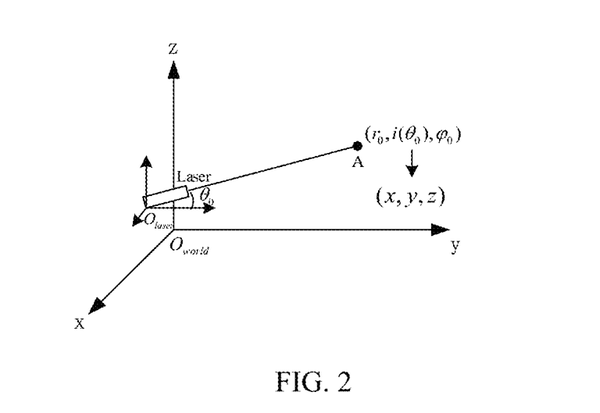
FIG. 2 is a schematic diagram of calibration of a laser radar according to an embodiment of the present invention.

Specifically, the laser radar is formed by combining and arranging a plurality of lasers (laser scanners) distributed along both sides of a central axis. Each laser has a fixed pitch angle, and may be regarded as a relatively independent collection system. The lasers rotate by 360 degrees around the central axis of the laser radar, perform sampling at fixed rotation angle intervals during rotation, and return originally collected information of a sampling point, that is, originally collected distance information $r_0$ of the sampling point, an index number $i(\theta_0)$ of a laser to which the sampling point belongs, and originally collected azimuth information $\varphi_0$. The information is expressed based on a local cylindrical coordinate system in which a corresponding laser is an origin. However, to facilitate subsequent processing of the point cloud, originally collected data of the point cloud needs to be converted to a Cartesian coordinate system in which the bottom of the laser radar is used as a unified origin to form a point cloud of the laser radar in the unified Cartesian coordinate system, that is, a point cloud finally collected by a device. This conversion process is a calibration process of the laser radar. As shown in FIG. 2, FIG. 2 is a schematic diagram of calibration of a laser radar according to an embodiment of the present invention. A calibration formula of the laser radar is as follows. Originally collected information $(r_0, i(\theta_0), \varphi_0)$ of a point is converted into Cartesian coordinates (x, y, z), $r_0$ in the originally collected information is originally collected distance information of the point, $i(\theta_0)$ is an index number of a laser to which the point belongs, and $\varphi_0$ is originally collected azimuth information of the point.

$\beta = \varphi_0 - \alpha;$ $x = (r_0 + D_{corr}) \cdot \cos\theta_0 \cdot \sin\beta - H_o \cdot \cos\beta;$ $y = (r_0 + D_{corr}) \cdot \cos\theta_0 \cdot \cos\beta + H_o \cdot \sin\beta;$ and $z = (r_0 + D_{corr}) \cdot \sin\theta_0 + V_o.$ $D_{corr}$ is a distance correction factor of the laser to which the point belongs, that is, an $i^{th}$ laser of the laser radar, $V_o$ is a vertical offset of the laser to which the point belongs, $H_o$ is a horizontal offset of the laser to which the point belongs, $\theta_0$ is a vertical elevation angle of the laser to which the point belongs, and $\alpha$ is a horizontal correction angle of the laser to which the point belongs. All the foregoing parameters are calibration parameters of the laser.

Then, $(r_0 + D_{corr}) \cdot \cos\theta_0 \approx r$ projected to an x-y plane is set, where r is depth information of a current point (x, y, z). In this case, $x = r \cdot \sin\beta - H_o \cdot \cos\beta;$ and $y = r \cdot \cos\beta + H_o \cdot \sin\beta.$ Then, conversion is performed by using an auxiliary angle formula to obtain:

$$x = r \cdot \sin\beta - H_o \cdot \cos\beta = \sqrt{r^2 + H_o^2} \cdot \sin\left(\beta - \arctan\frac{H_o}{r}\right); \text{ and}$$

$$y = r \cdot \cos\beta + H_o \cdot \sin\beta = \sqrt{r^2 + H_o^2} \cdot \cos\left(\beta - \arctan\frac{H_o}{r}\right).$$

In this case, azimuth information $\varphi$ of the point is calculated as follows by using x and y.

$$\varphi = \arctan\frac{x}{y} = \arctan\left(\frac{r \cdot \sin\beta - H_o \cdot \cos\beta}{r \cdot \cos\beta + H_o \cdot \sin\beta}\right) = \arctan\left(\tan\left(\beta - \arctan\frac{H_o}{r}\right)\right) = \beta - \arctan\frac{H_o}{r}$$

Finally $\beta = \varphi_0 - \alpha$ is substituted into the foregoing equation, so that a relational expression between the depth information r and the azimuth information $\varphi$ of the point cloud can be obtained:

$$\varphi - \varphi_0 = -\alpha - \arctan\frac{H_o}{r}.$$

$\varphi_0$ is the originally collected azimuth information of the point, $H_o$ is the horizontal offset of the laser to which the point belongs, $\alpha$ is the horizontal correction angle of the laser to which the point belongs, and both $H_o$ and $\alpha$ are calibration parameters of the laser.

In another embodiment of the present invention, the relationship between the depth information and the azimuth information of the point cloud may alternatively be established from a geometric perspective based on a collection principle of the laser radar.

Figure 3:
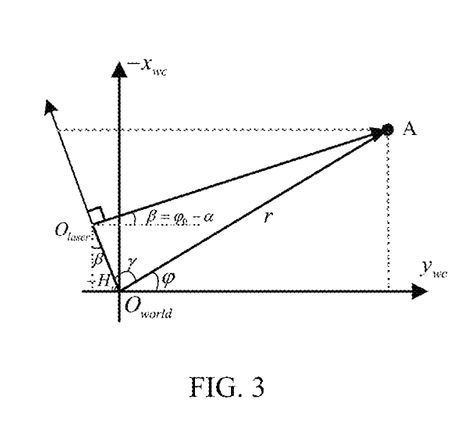
FIG. 3 is a schematic diagram of calibration of a laser radar on an x-y plane according to an embodiment of the present invention.

Specifically, the laser radar performs calibration in a process of collecting the point cloud, and converts originally collected information represented in a laser local cylindrical coordinate system into a Cartesian coordinate system in which the bottom of the laser radar is used as a unified origin, to form a point cloud of the laser radar in the unified Cartesian coordinate system, that is, a point cloud finally collected by a device, as shown in FIG. 2. However, the azimuth information of the point cloud is represented on an x-y plane in the Cartesian coordinate system, and therefore, FIG. 3 is further derived from FIG. 2. FIG. 3 is a schematic diagram of calibration of the laser radar on the x-y plane according to an embodiment of the present invention.

It may be derived from FIG. 3 that $$\gamma = \arccos\left(\frac{|O_{world}O_{laser}|}{r}\right) = \arccos\left(\frac{-H_0}{r}\right),$$

where $r=\sqrt{x^2+y^2}$ is the depth information of the point, and $H_o$ is a horizontal offset of a laser to which the point belongs. Because $H_o$ herein is a negative value, $|O_{world}O_{laser}|=-H_o$. $90°-\beta=180°-\gamma-\varphi$ may be further obtained. Then, $\beta=\varphi_0-\alpha$ and $$\gamma = \arccos\left(\frac{-H_0}{r}\right)$$

are substituted to obtain the relational expression $$\varphi - \varphi_0 = 90° - \alpha - \arccos\left(-\frac{H_o}{r}\right)$$

between the depth information r and the azimuth information $\varphi$ of the point cloud.

$\varphi_0$ is the originally collected azimuth information of the point, $H_o$ is the horizontal offset of the laser to which the point belongs, $\alpha$ is the horizontal correction angle of the laser to which the point belongs, and both $H_o$ and $\alpha$ are calibration parameters of the laser.

Figure 4:
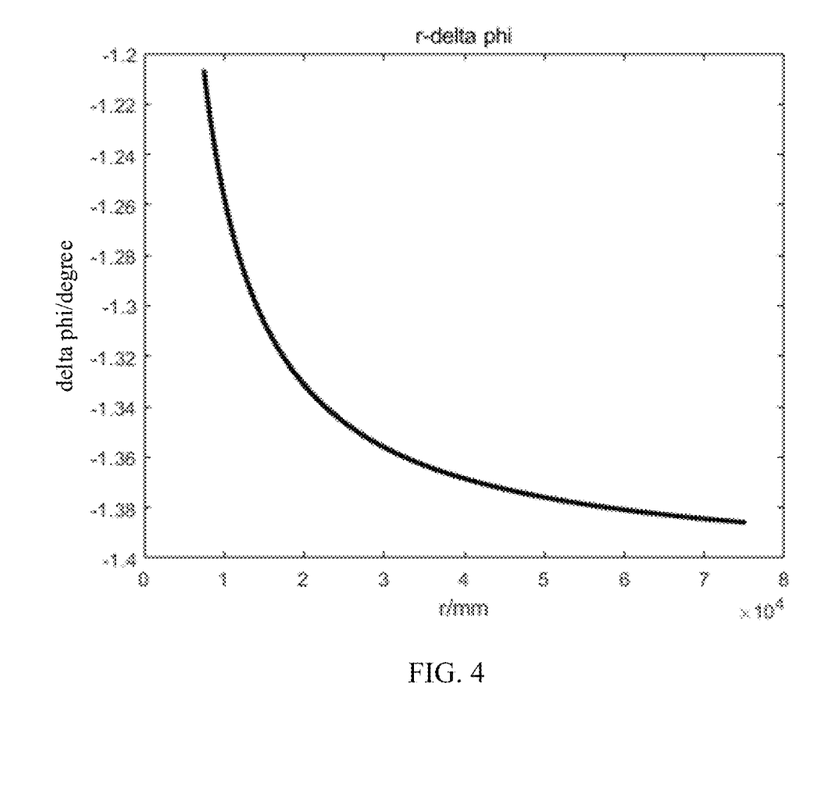
FIG. 4 is a schematic diagram of a relation curve of depth information of a specific laser collection point and an azimuth residual according to an embodiment of the present invention.

It should be noted that, because approximate treatment is adopted during derivation from the algebraic perspective, the relational expressions obtained in the foregoing two manners are different in form, but are almost identical in relation curves. As shown in FIG. 4, FIG. 4 is a schematic diagram of a relation curve between depth information and an azimuth residual of a laser collection point according to an embodiment of the present invention. In the figure, an x coordinate is depth information r of a point, and a y coordinate is an azimuth residual $\Delta\varphi$ of the point, where $\Delta\varphi=\varphi-\varphi_0$, $\varphi$ is azimuth information of the point, and $\varphi_0$ is originally collected azimuth information of the point.

In addition, the relationship between the depth information and the azimuth information of the point cloud may alternatively be established by using a fitting method.

After the relational expression between the depth information and the azimuth information of the point cloud is obtained, unknown parameters in the relational expression further need to be estimated, so that the azimuth information of the point cloud is subsequently predicted by using the relationship between the depth information and the azimuth information.

Specifically, several points may be selected from points collected by a same laser or encoded points, and unknown parameters $\alpha$ and $H_o$ in the relational expression may be calculated based on information about the selected points.

A parameter estimation process is described in detail below by using an example in which two points are selected from the points collected by the same laser to estimate parameters.

First, two points are selected from the points collected by the same laser. Specific descriptions are as follows:

Depth information r and azimuth information $\varphi$ of the points collected by the same laser are calculated based on the following formula:

$$r=\sqrt{x^2+y^2}; \text{ and}$$

$$\varphi = \arctan\frac{y}{x}.$$

Figure 5:
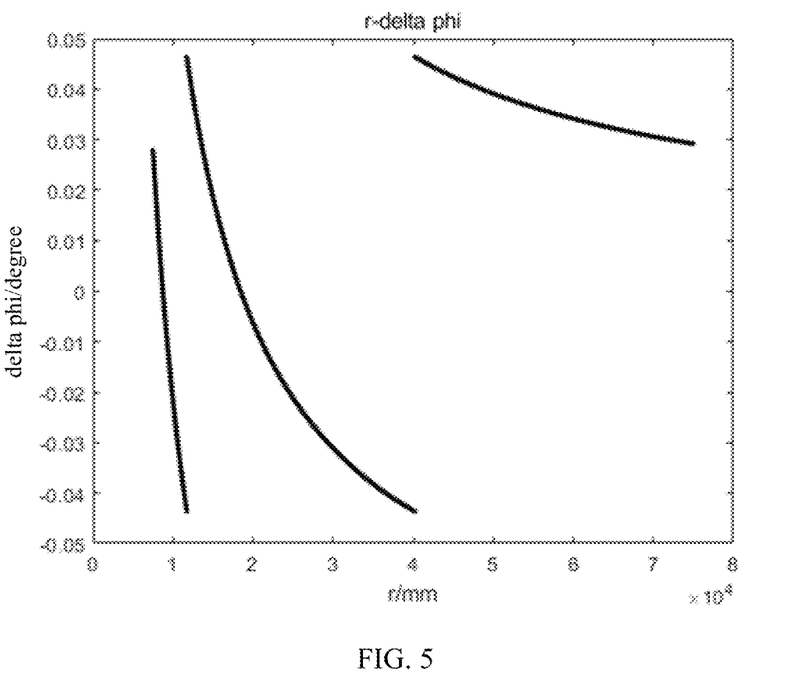
FIG. 5 is a schematic diagram of segmented hopping of a relation curve of depth information of a specific laser collection point and an azimuth residual according to an embodiment of the present invention.

Then, an approximate value $\varphi_0'$ of the originally collected azimuth of the point is calculated based on the following formula, to obtain the azimuth residual $\Delta\varphi$:

$$j = \text{round}\left(\frac{180° + \varphi}{\varphi_{speed}}\right);$$

$$\varphi_0' = -180° + j \cdot \varphi_{speed}; \text{ and}$$

$$\Delta\varphi = \varphi - \varphi_0'.$$

j is an azimuth index of the point, and $\varphi_{speed}$ is resolution of a sampling angle of the laser. In this case, the azimuth residual $$\Delta\varphi \in \left[-\frac{\varphi_{speed}}{2}, \frac{\varphi_{speed}}{2}\right]$$

is calculated based on the foregoing formula. Therefore, a relation curve between the depth information of the point cloud and the azimuth residual hops in segments in this case. As shown in FIG. 5, FIG. 5 is a schematic diagram of segmented hopping of a relation curve between depth information of a laser collection point and an azimuth residual according to an embodiment of the present invention.

Then, points collected by all lasers are sequentially sorted based on the depth information r and the azimuth residual $\Delta\varphi$. Because the relation curve between the depth information r and the azimuth residual $\Delta\varphi$ in this embodiment hops in segments, the two selected points need to be located on a same segment of segmented curve, and a segmented curve including most points needs to be selected. Finally, points on both ends of the segment curve that meet a condition are used as two finally selected points.

Then, unknown parameters $\alpha$ and $H_o$ in the relational expression are estimated based on the two selected points. Specific descriptions are as follows:

The relational expression between the depth information r and the azimuth residual $\Delta\varphi$ is obtained based on the relational expression between the depth information r and the azimuth information φ of the point cloud:

$$\varphi - \varphi_0 = -\alpha - \arctan\frac{H_o}{r} \xrightarrow{\Delta\varphi = \varphi - \varphi_0} \Delta\varphi = -\alpha - \arctan\frac{H_o}{r}.$$

The relational expression between the depth information r of the point cloud and the azimuth residual Δφ is further as follows:

$$\Delta\varphi = -\alpha - \arctan\frac{H_o}{r} \Rightarrow \tan(\Delta\varphi + \alpha) = \frac{-H_o}{r};$$

and $$\tan(\Delta\varphi + \alpha) = \frac{\tan\Delta\varphi + \tan\alpha}{1 - \tan\Delta\varphi \cdot \tan\alpha}.$$

r and Δφ are substituted into the relational expression between r and Δφ, to obtain:

$$r \cdot \tan\Delta\varphi + r \cdot \tan\alpha + H_o - H_o \cdot \tan\Delta\varphi \cdot \tan\alpha = 0.$$

The depth information and the azimuth residual of the two selected points are respectively denoted as $(r_1, \Delta\varphi_1)$ and $(r_2, \Delta\varphi_2)$, and $(r_1, \Delta\varphi_1)$ and $(r_2, \Delta\varphi_2)$ are substituted to obtain an equation set:

$$r_1 \cdot \tan\Delta\varphi_1 + r_1 \cdot \tan\alpha + H_o - H_o \cdot \tan\Delta\varphi_1 \cdot \tan\alpha = 0$$

$$r_2 \cdot \tan\Delta\varphi_2 + r_2 \cdot \tan\alpha + H_o - H_o \cdot \tan\Delta\varphi_2 \cdot \tan\alpha = 0.$$

Unknown numbers in the equation set are $H_o$ and $\tan\alpha$, and finally, the binary equation set is solved to obtain:

$$H_o = \frac{(r_1 - r_2) \cdot (1 + \tan\Delta\varphi_1 \cdot \tan\Delta\varphi_2) \pm \sqrt{(r_1 - r_2)^2(1 + \tan\Delta\varphi_1 \cdot \tan\Delta\varphi_2)^2 - 4(\tan\Delta\varphi_1 - \tan\Delta\varphi_2)^2 \cdot r_1 \cdot r_2}}{2(\tan\Delta\varphi_1 - \tan\Delta\varphi_2)}$$

$$\tan\alpha = \frac{r_1 \cdot \tan\Delta\varphi_1 - r_2 \cdot \tan\Delta\varphi_2}{H_o \cdot (\tan\Delta\varphi_1 - \tan\Delta\varphi_2) - (r_1 - r_2)}.$$

It should be noted that $H_o$ may have two possible solutions, and a value that has a minimum absolute value and that meets a condition needs to be selected from the two possible solutions as $H_o$ obtained through final solution and estimation. α has only one possible solution, and may be obtained by solving an inverse trigonometric function of tan a obtained through calculation of the foregoing formula.

Further, to predict the azimuth information of the point cloud by using the relationship on a decoder, estimated parameters $H_o$ and α of each laser need to be encoded. Specific encoding may be completed by using an existing entropy encoding technology. If the parameters $H_o$ and α are known, the parameters $H_o$ and α do not need to be estimated and encoded.

After the parameters $H_o$ and α in the relational expression are obtained, the relationship between the depth information and the azimuth information of the point cloud is entirely established.

Step 4: Predictively encode the azimuth information of the point cloud by using the relationship between the depth information and the azimuth information of the point cloud, to obtain coded stream information. This specifically includes the following steps:

41) Predict the azimuth of the point cloud based on the relationship between the depth information and the azimuth information of the point cloud, to obtain an initial predicted value of an azimuth residual.

Specifically, first, cylindrical coordinates (r,φ,i) of each point in the point cloud are calculated based on Cartesian coordinates (x, y, z) of the point. Calculation formulas of the cylindrical coordinates are as follows:

$$r = \sqrt{x^2 + y^2};$$

$$\varphi = \arctan\frac{y}{x}; \text{ and}$$

$$i = \arg\min_{k=1\ldots laserNum} |z - V_o^k - r \times \tan\theta_0^k|.$$

r represents depth information of the point, φ represents azimuth information of the point, i represents an ID of a laser to which the point belongs, $V_o^k$ is a vertical offset of a $k^{th}$ laser, $\theta_0^k$ is a vertical elevation angle of the $k^{th}$ laser, and both $V_o^k$ and $\theta_0^k$ are calibration parameters of the $k^{th}$ laser.

Then, an azimuth index j of the current point, an approximate value $\theta_0'$ of an originally collected azimuth, and an azimuth residual Δφ are calculated based on resolution $\varphi_{speed}$ of a sampling angle of the laser radar. Specific calculation formulas are as follows:

$$j = \text{round}\left(\frac{180° + \varphi}{\varphi_{speed}}\right);$$

$$\varphi_0' = -180° + j \cdot \varphi_{speed}; \text{ and}$$

$$\Delta\varphi = \varphi - \varphi_0'.$$

Finally, an initial predicted value $\Delta\hat{\varphi}$ of the azimuth residual Δφ is obtained based on the depth information r of the current point and a corresponding relational expression between the depth information and the azimuth information. A specific formula is as follows:

$$\Delta\hat{\varphi} = -\alpha^i - \arctan\frac{H_o^i}{r}.$$

$H_o^i$ represents a horizontal offset of an $i^{th}$ laser to which the current point belongs, α' represents a horizontal correction angle of the $i^{th}$ laser to which the current point belongs, and both $H_o^i$ and α' are calibration parameters of the $i^{th}$ laser.

42) Selectively shift the initial predicted value of the azimuth residual to obtain a final predicted value of the azimuth residual and a prediction residual of the azimuth residual.

It should be noted that azimuth residuals calculated in different manners may have different characteristics, and whether to correspondingly shift the initial predicted value of the azimuth residual needs to be determined based on the characteristic of the azimuth residual.

The azimuth residual $$\Delta\varphi \in \left[-\frac{\varphi_{speed}}{2}, \frac{\varphi_{speed}}{2}\right]$$

calculated in this embodiment does not continuously change as the depth information r increases, but is continuous in segments. Therefore, as shown in FIG. 5, the initial predicted value $\Delta\hat{\varphi}$ obtained by using the relational expression needs to be correspondingly shifted, to obtain a final predicted value $\Delta\tilde{\varphi}$ of the azimuth residual and a prediction residual $res_{\Delta\varphi}$ of the azimuth residual, where $$\Delta\tilde{\varphi} \in \left[-\frac{\varphi_{speed}}{2}, \frac{\varphi_{speed}}{2}\right].$$

Specifically, a shifting method may be as follows: First, a reminder obtained after the initial predicted value $\Delta\hat{\varphi}$ of the azimuth residual is divided by the resolution $\varphi_{speed}$ of the sampling angle of the laser radar is used to initialize the final predicted value $\Delta\tilde{\varphi}$ of the azimuth residual, that is, $\Delta\tilde{\varphi}=\Delta\hat{\varphi}\%\varphi_{speed}$. Then, determining is performed; if $\Delta\tilde{\varphi}$ is greater than $$\frac{\varphi_{speed}}{2}, \Delta\tilde{\varphi} = \Delta\tilde{\varphi} - \varphi_{speed};$$

and if $\Delta\tilde{\varphi}$ is less than $$-\frac{\varphi_{speed}}{2}, \Delta\tilde{\varphi} = \Delta\tilde{\varphi} + \varphi_{speed},$$

so that the final predicted value $\Delta\tilde{\varphi}$ of the azimuth residual is obtained. Finally, the prediction residual $res_{\Delta\varphi}$ of the azimuth residual is calculated by using a formula $res_{\Delta\varphi}=\Delta\hat{\varphi}-\Delta\tilde{\varphi}$.

In addition, another shifting method may alternatively be selected. This is not specifically limited in this embodiment.

43) Encode the prediction residual of the azimuth residual and azimuth auxiliary information.

Specifically, the prediction residual $res_{\Delta\varphi}$ of the azimuth residual may be encoded by using an existing entropy encoding technology. In addition, the azimuth auxiliary information needs to be correspondingly encoded. In this embodiment, the azimuth auxiliary information is an azimuth index j of a point. Specifically, the azimuth index j of the point may be encoded in a differential encoding manner.

In the present invention, the relationship between the depth information and the azimuth information of the point cloud is established, and cross-component prediction is performed on the azimuth information by using the depth information of the point cloud and the foregoing relationship. Compared with an existing method for performing prediction by using only encoded information of an azimuth, the method provided in the present invention can further improve prediction precision of the azimuth information of the point cloud, and reduce a prediction residual of the azimuth information, so that distribution of prediction residuals of an azimuth is more centralized. In this way, a more effective context model is established in an entropy encoding process, and therefore, encoding efficiency of the point cloud is improved.

Embodiment 2

Figure 6:
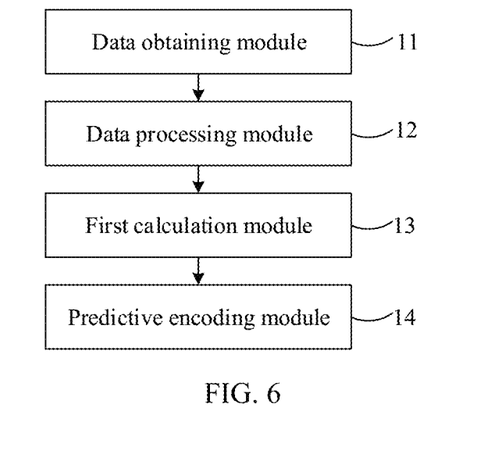
FIG. 6 is a schematic diagram of a structure of a predictive encoding apparatus for azimuth information of a point cloud according to an embodiment of the present invention.

Based on Embodiment 1, this embodiment provides a predictive encoding apparatus for azimuth information of a point cloud. Refer to FIG. 6. FIG. 6 is a schematic diagram of a structure of a predictive encoding apparatus for azimuth information of a point cloud according to an embodiment of the present invention. The apparatus includes:

a data obtaining module 11, configured to obtain original point cloud data;

a data processing module 12, configured to obtain depth information of a point cloud based on the original point cloud data;

a first calculation module 13, configured to establish a relationship between the depth information and azimuth information of the point cloud; and a predictive encoding module 14, configured to predictively encode the azimuth information of the point cloud by using the relationship between the depth information and the azimuth information of the point cloud, to obtain coded stream information.

The apparatus provided in this embodiment can implement the encoding method provided in Embodiment 1, and a detailed process is not described herein again.

Embodiment 3

Figure 7:
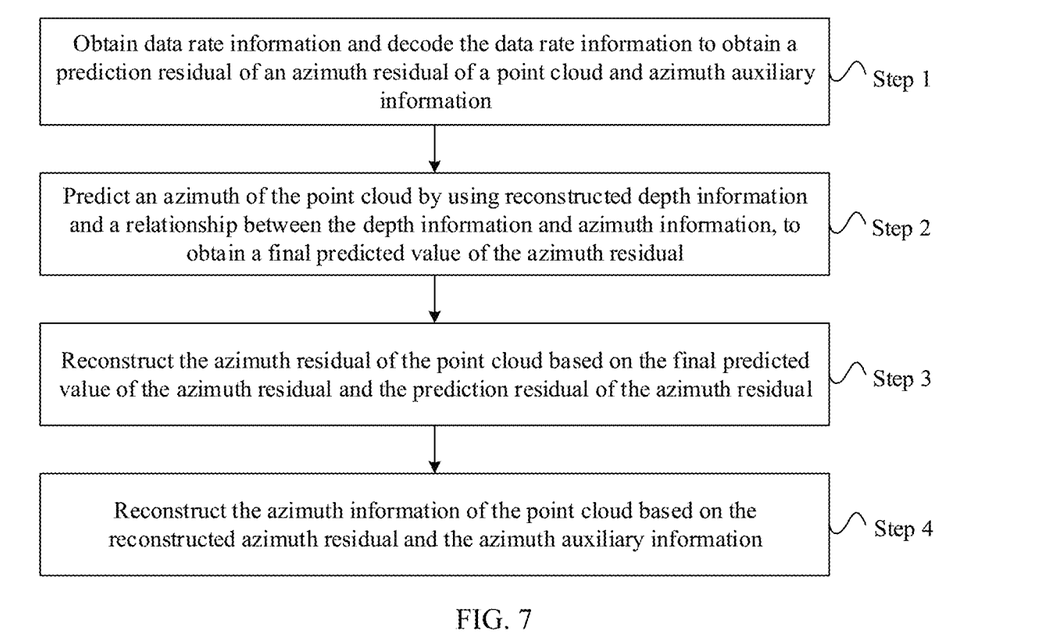
FIG. 7 is a schematic flowchart of a predictive decoding method for azimuth information of a point cloud according to an embodiment of the present invention.

This embodiment provides a predictive decoding method for azimuth information of a point cloud. Refer to FIG. 7. FIG. 7 is a schematic flowchart of a predictive decoding method for azimuth information of a point cloud according to an embodiment of the present invention. The method specifically includes the following steps:

Step 1: Obtain coded stream information and decode the coded stream information to obtain a prediction residual of an azimuth residual of a point cloud and azimuth auxiliary information.

A decoder obtains compressed coded stream information, and decodes the coded stream information by using an existing entropy decoding technology to obtain the prediction residual of the azimuth residual of the point cloud and the azimuth auxiliary information.

Step 2: Predict an azimuth of the point cloud by using reconstructed depth information and a relationship between the depth information and azimuth information, to obtain a final predicted value of the azimuth residual.

Specifically, similar to a procedure on an encoder, first, the azimuth residual information of the point is predicted by using depth information of the point cloud reconstructed by the decoder and the relationship between the depth information and the azimuth information, to obtain an initial predicted value of the azimuth residual, and then, the initial predicted value of the azimuth residual is selectively shifted to obtain a final predicted value of the azimuth residual.

Step 3: Reconstruct the azimuth residual of the point cloud based on the final predicted value of the azimuth residual and the prediction residual of the azimuth residual.

Specifically, the final predicted value of the azimuth residual and the prediction residual of the azimuth residual obtained through decoding are added, so that the azimuth residual of the point cloud can be reconstructed.

Step 4: Reconstruct the azimuth information of the point cloud based on the reconstructed azimuth residual and the azimuth auxiliary information.

Specifically, first, an approximate value of an originally collected azimuth of the point cloud is calculated by using a decoded azimuth index, and then the reconstructed azimuth residual and the approximate value of the originally collected azimuth are added, so that the azimuth information of the point cloud can be reconstructed.

Embodiment 4

Figure 8:
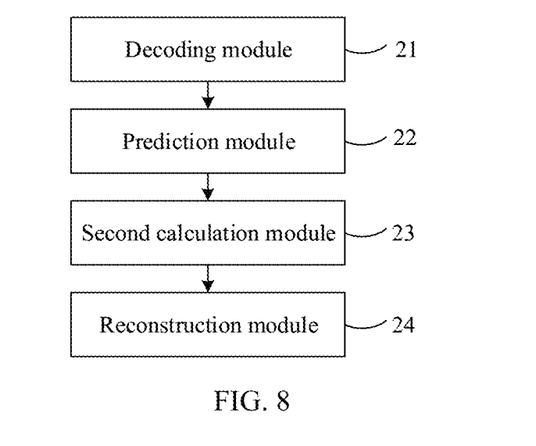
FIG. 8 is a schematic diagram of a structure of a predictive decoding apparatus for azimuth information of a point cloud according to an embodiment of the present invention.

Based on Embodiment 3, this embodiment provides a predictive decoding apparatus for azimuth information of a point cloud. Refer to FIG. 8. FIG. 8 is a schematic diagram of a structure of a predictive decoding apparatus for azimuth information of a point cloud according to an embodiment of the present invention. The apparatus includes:

a decoding module 21, configured to obtain coded stream information and decode the coded stream information to obtain a prediction residual of an azimuth residual of a point cloud and azimuth auxiliary information;

a prediction module 22, configured to predict an azimuth of the point cloud by using reconstructed depth information and a relationship between the depth information and azimuth information, to obtain a final predicted value of the azimuth residual;

a second calculation module 23, configured to reconstruct the azimuth residual of the point cloud based on the predicted value of the azimuth residual and the prediction residual of the azimuth residual; and a reconstruction module 24, configured to reconstruct the azimuth information of the point cloud based on the reconstructed azimuth residual and the azimuth auxiliary information.

The apparatus provided in this embodiment can implement the decoding method provided in Embodiment 3, and a detailed process is not described herein again.

The foregoing content is further detailed descriptions of the present invention with reference to specific preferred implementations, and it cannot be assumed that specific implementation of the present invention is limited to these descriptions. For a person of ordinary skill in the art to which the present invention belongs, several simple deductions or substitutions may be made without departing from the inventive concept, which shall be regarded as falling within the protection scope of the present invention.

What is claimed is:

1. A predictive encoding method for azimuth information of a point cloud, the method comprising:
   obtaining original point cloud data;
   obtaining depth information of a point cloud based on the original point cloud data;
   establishing a relationship between the depth information and azimuth information of the point cloud, wherein establishing the relationship between the depth information and the azimuth information of the point cloud comprises:
      establishing the relationship between the depth information and the azimuth information of the point cloud by using a mathematical derivation method; and
   predictively encoding the azimuth information of the point cloud using the relationship between the depth information and the azimuth information of the point cloud, to obtain coded stream information; and
   wherein a relational expression between the depth information and the azimuth information of the point cloud is established using the mathematical derivation method as follows:

$$\varphi - \varphi_0 = -\alpha - \arctan\frac{H_o}{r};$$

wherein
   $\varphi$ represents azimuth information of a respective point, $\varphi_0$ represents originally collected azimuth information of the respective point, r represents depth information of the respective point, $\alpha$ represents a horizontal correction angle of a laser to which the respective point belongs, and $H_o$ represents a horizontal offset of the laser to which the respective point belongs.

2. The predictive encoding method according to claim 1, wherein the original point cloud data includes a group of 3D spatial points, each spatial point in the group of 3D spatial points records its geometric position information, and the geometric position information of each spatial point is expressed based on a Cartesian coordinate system.

3. The predictive encoding method according to claim 1, wherein obtaining the depth information of a point cloud based on the original point cloud data comprises:
   calculating the depth information of the point cloud using the following formula:

$$r32\sqrt{x^2+y^2}; \text{ or } r=\sqrt{x^2+y^2+z^2};$$

wherein r represents depth information of a respective point in the original point cloud data, and x and y are Cartesian coordinate components of the respective point; or (x, y, z) are Cartesian coordinates of the respective point.

4. The predictive encoding method according to claim 1, wherein after the relational expression between the depth information and the azimuth information of the point cloud is obtained, the method further comprises:
   selecting several points from points collected by a same laser or encoded points and estimating unknown parameters $\alpha$ and $H_o$ in the relational expression based on information about the selected points.

5. The predictive encoding method according to claim 4, wherein a formula for estimating the unknown parameters $\alpha$ and $H_o$ by selecting two points is:

$$H_o = \frac{(r_1 - r_2)\cdot(1 + \tan\Delta\varphi_1\cdot\tan\Delta\varphi_2) \pm \sqrt{(r_1 - r_2)^2\cdot(1 + \tan\Delta\varphi_1\tan\Delta\varphi_2)^2 - 4(\tan\Delta\varphi_1 - \tan\Delta\varphi_2)^2\cdot r_1\cdot r_2}}{2(\tan\Delta\varphi_1 - \tan\Delta\varphi_2)}$$

$$\tan\alpha = \frac{r_1\cdot\tan\Delta\varphi_1 - r_2\cdot\tan\Delta\varphi_2}{H_o\cdot(\tan\Delta\varphi_1 - \tan\Delta\varphi_2) - (r_1 - r_2)};$$

wherein
   $r_1$ and $r_2$ separately represent depth information of the two selected points, and $\Delta\varphi_1$ and $\Delta\varphi_2$ separately represent azimuth residuals of the two selected points.

6. The predictive encoding method according to claim 1, wherein predictively encoding the azimuth information of the point cloud using the relationship between the depth information and the azimuth information of the point cloud comprises:
   predicting the azimuth of the point cloud based on the relationship between the depth information and the azimuth information of the point cloud, to obtain an initial predicted value of an azimuth residual;
   selectively shifting the initial predicted value of the azimuth residual to obtain a final predicted value of the azimuth residual and a prediction residual of the azimuth residual; and
   encoding the prediction residual of the azimuth residual and azimuth auxiliary information.

7. The predictive encoding method according to claim 6, wherein predicting the azimuth of the point cloud based on the relationship between the depth information and the azimuth information of the point cloud, to obtain the initial predicted value of the azimuth residual, comprises:

obtaining the initial predicted value $\Delta\hat{\varphi}$ of the azimuth residual $\Delta\varphi$ based on a formula as follows:

$$\Delta\hat{\varphi} = -\alpha^i - \arctan\frac{H_o^i}{r};$$

and
  wherein $H_o^i$ represents a horizontal offset of an $i^{th}$ laser to which a current point belongs, $\alpha^i$ represents a horizontal correction angle of the $i^{th}$ laser to which a current point belongs, and both $H_o^i$ and $\alpha^i$ are calibration parameters of the $i^{th}$ laser.

8. The predictive encoding method according to claim 7, wherein selectively shifting the initial predicted value of the azimuth residual to obtain the final predicted value of the azimuth residual and the prediction residual of the azimuth residual comprises:
  obtaining a reminder after the initial predicted value $\Delta\hat{\varphi}$ of the azimuth residual is divided by the resolution $\varphi_{speed}$ of a sampling angle of a laser radar;
  using the reminder to initialize the final predicted value $\Delta\tilde{\varphi}$ of the azimuth residual $\Delta\tilde{\varphi}=\Delta\hat{\varphi}\%\varphi_{speed}$;
  determining whether $\Delta\tilde{\varphi}$ is greater than $$\frac{\varphi_{speed}}{2}, \Delta\tilde{\varphi} = \Delta\tilde{\varphi} - \phi_{speed},$$

and whether $\Delta\tilde{\varphi}$ is less than $$-\frac{\varphi_{speed}}{2}, \Delta\tilde{\varphi} = \Delta\tilde{\varphi} + \phi_{speed};$$

and
  calculating the prediction residual $res_{\Delta\varphi}$ of the azimuth residual using a formula $res_{\Delta\phi}=\Delta\phi-\Delta\tilde{\phi}$.

9. The predictive encoding method according to claim 6, wherein encoding the prediction residual of the azimuth residual and azimuth auxiliary information comprises:
  using an entropy encoding technology to encode the prediction residual of the azimuth residual; and
  encoding the azimuth auxiliary information in a differential encoding manner, wherein the azimuth auxiliary information is an azimuth index j of the point.

10. A predictive encoding device for azimuth information of a point cloud, the device comprising:
  a processor; and
  memory storing at least one instruction that, when executed by the at least one processor, cause the device to perform operations comprising:
    obtaining original point cloud data;
    obtaining depth information of a point cloud based on the original point cloud data;
    establishing a relationship between the depth information and azimuth information of the point cloud, wherein establishing the relationship between the depth information and the azimuth information of the point cloud comprises:
      establishing the relationship between the depth information and the azimuth information of the point cloud by using a mathematical derivation method; and
    predictively encoding the azimuth information of the point cloud using the relationship between the depth information and the azimuth information of the point cloud, to obtain coded stream information; and
  wherein a relational expression between the depth information and the azimuth information of the point cloud is established using the mathematical derivation method as follows:

$$\varphi - \varphi_0 = -\alpha - \arctan\frac{H_o}{r};$$

wherein
  $\varphi$ represents azimuth information of a respective point, $\varphi_0$ represents originally collected azimuth information of the respective point, I represents depth information of the respective point, $\alpha$ represents a horizontal correction angle of a laser to which the respective point belongs, and $H_o$ represents a horizontal offset of a laser to which the respective point belongs.

11. The predictive encoding device according to claim 10, wherein after the relational expression between the depth information and the azimuth information of the point cloud is obtained, the method further comprises:
  selecting several points from points collected by a same laser or encoded points and estimating unknown parameters $\alpha$ and $H_o$ in the relational expression based on information about the selected points.

12. The predictive encoding device according to claim 11, wherein a formula for estimating the unknown parameters $\alpha$ and $H_o$ by selecting two points is:

$$H_o = \frac{(r_1 - r_2)\cdot(1 + \tan\Delta\varphi_1 \cdot \tan\Delta\varphi_2) \pm \sqrt{(r_1-r_2)^2\cdot(1+\tan\Delta\varphi_1\tan\Delta\varphi_2)^2 - 4(\tan\Delta\varphi_1-\tan\Delta\varphi_2)^2\cdot r_1\cdot r_2}}{2(\tan\Delta\varphi_1 - \tan\Delta\varphi_2)}$$

$$\tan\alpha = \frac{r_1\cdot\tan\Delta\varphi_1 - r_2\cdot\tan\Delta\varphi_2}{H_o\cdot(\tan\Delta\varphi_1 - \tan\Delta\varphi_2) - (r_1 - r_2)};$$

wherein
  $r_1$ and $r_2$ separately represent depth information of the two selected points, and $\Delta\varphi_1$ and $\Delta\varphi_2$ separately represent azimuth residuals of the two selected points.

13. The predictive encoding device according to claim 10, wherein predictively encoding the azimuth information of the point cloud using the relationship between the depth information and the azimuth information of the point cloud comprises:
  predicting the azimuth of the point cloud based on the relationship between the depth information and the azimuth information of the point cloud, to obtain an initial predicted value of an azimuth residual;
  selectively shifting the initial predicted value of the azimuth residual to obtain a final predicted value of the azimuth residual and a prediction residual of the azimuth residual; and
  encoding the prediction residual of the azimuth residual and azimuth auxiliary information.

14. The device according to claim 10, wherein obtaining the depth information of a point cloud based on the original point cloud data comprises:
  calculating the depth information of the point cloud using the following formula:

$$r = \sqrt{x^2+y^2};\ or\ r=\sqrt{x^2+y^2+z^2};$$

wherein r represents depth information of a respective point in the original point cloud data, and x and y are Cartesian coordinate components of the respective point; or (x, y, z) are Cartesian coordinates of the respective point.

15. The device according to claim 10, wherein the original point cloud data includes a group of 3D spatial points, each spatial point in the group of 3D spatial points records its geometric position information, and the geometric position information of each spatial point is expressed based on a Cartesian coordinate system.

16. A predictive decoding method for azimuth information of a point cloud, comprising:
obtaining coded stream information, and decoding the coded stream information to obtain a prediction residual of an azimuth residual of a point cloud and azimuth auxiliary information;
predicting an azimuth of the point cloud using reconstructed depth information and a relationship between the depth information and azimuth information, to obtain a final predicted value of the azimuth residual;
reconstructing the azimuth residual of the point cloud based on the final predicted value of the azimuth residual and the prediction residual of the azimuth residual; and
reconstructing the azimuth information of the point cloud based on the reconstructed azimuth residual and the azimuth auxiliary information.

17. The method according to claim 16, wherein obtaining the coded stream information, and decoding the coded stream information to obtain the prediction residual of the azimuth residual of the point cloud and the azimuth auxiliary information comprises:
obtaining compressed coded stream information and decoding the compressed coded stream information by using entropy decoding, to obtain the prediction residual of the azimuth residual of the point cloud and the azimuth auxiliary information.

18. The method according to claim 17, wherein predicting the azimuth of the point cloud using the reconstructed depth information and the relationship between the depth information and the azimuth information, to obtain the final predicted value of the azimuth residual comprises:
predicting azimuth residual information of the point cloud by using depth information of the point cloud and the relationship between the depth information and the azimuth information, to obtain an initial predicted value of the azimuth residual; and
selectively shifting the initial predicted value of the azimuth residual to obtain a final predicted value of the azimuth residual.

19. The method according to claim 18, wherein reconstructing the azimuth residual of the point cloud based on the final predicted value of the azimuth residual and the prediction residual of the azimuth residual comprises:
adding the final predicted value of the azimuth residual and the prediction residual of the azimuth residual, to reconstruct the azimuth residual of the point cloud.

20. The method according to claim 19, wherein reconstructing the azimuth information of the point cloud based on the reconstructed azimuth residual and the azimuth auxiliary information comprises:
calculating an approximate value of an originally collected azimuth of the point cloud by using a decoded azimuth index; and
adding the reconstructed azimuth residual and the approximate value of the originally collected azimuth, to reconstruct the azimuth information of the point cloud.

* * * * *